(No Model.)
T. THATCHER.
CAR AXLE BOX.
No. 318,520. Patented May 26, 1885.
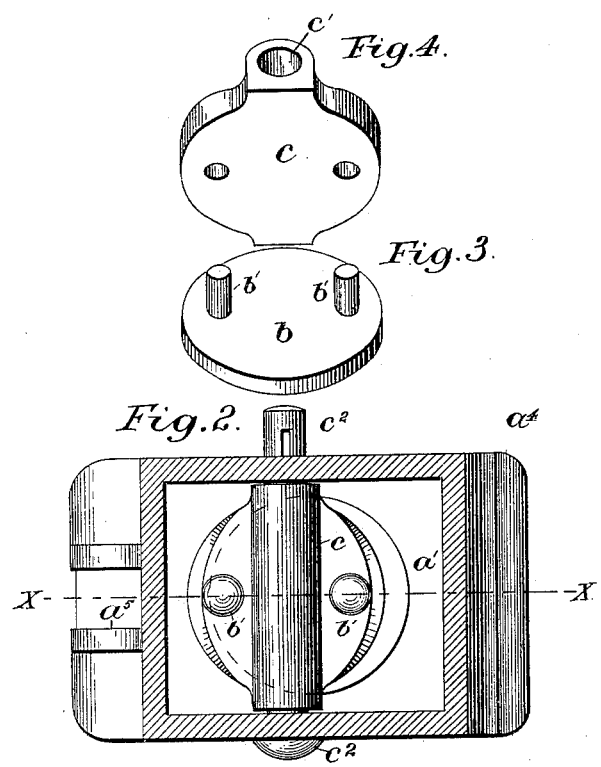
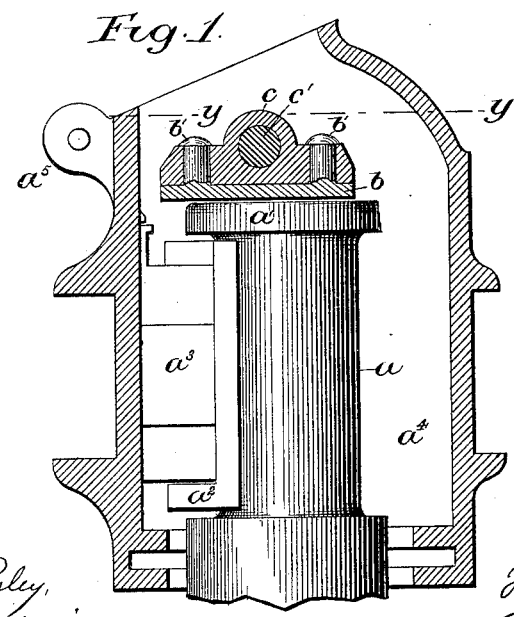
Witnesses
Edwin H. Risley,
Charles W. F. Horsie,
Inventor
Thomas Thatcher
By Risley Quin & Berry
attys
N. PETERS, Photo-Lithographer, Washington, D. C.

UNITED STATES PATENT OFFICE.

THOMAS THATCHER, OF UTICA, NEW YORK, ASSIGNOR OF ONE-HALF TO WALTER DAWSON, OF SCRANTON, PENNSYLVANIA.

CAR-AXLE BOX.

SPECIFICATION forming part of Letters Patent No. 318,520, dated May 26, 1885.

Application filed July 16, 1884. (No model.)

*To all whom it may concern:*

Be it known that I, THOMAS THATCHER, a citizen of the United States, and a resident of the city of Utica, county of Oneida, and State of New York, have invented a new and useful Improvement in Axle End-Bearings; and I do hereby declare the following to be a full, clear, and exact description of the same, reference being had to the accompanying drawings, and to letters and figures marked thereon.

My invention relates to an axle end-bearing for car and locomotive trucks; and it consists in the mechanism hereinafter described.

In the accompanying drawings, Figure 1 represents a longitudinal section of the axle, collar, end bearing, journal-bearing cap, and oil-box, taken at line $x\,x$, Fig. 2. Fig. 2 represents an end view of the axle and end-bearing, with section of oil-box cut away, taken at line $y\,y$. Fig. 3 represents a perspective view of the disk, and Fig. 4 represents a perspective view of the seat or support.

Having described my invention by reference to the figures in the accompanying drawings, I will proceed to describe it by reference to the letters marked thereon, in which similar letters refer to corresponding parts throughout the several views.

$a$ represents the journal of the axle of a car-truck. $a'$ represents the ordinary collar turned on the end of same.

$a^2$ represents the journal-bearing. $a^3$ represents the cap to the same. $a^4$ represents the oil-box, which incloses the same.

$a^5$ represents the projecting lug on the upper portion of the oil-box, to which a lid is ordinarily attached.

Heretofore the end-thrust and the lateral motion of the car and truck have been taken by the collar and journal-bearing, resulting in friction and rapid wear, producing heated journals and creating an excessive lateral motion in the car and truck. To obviate these difficulties I have provided an end-bearing.

I accomplish this by means of a disk formed of steel or other suitable metal, supported in the oil-box opposite and in proximity to the end of the axle, so located as to receive the end-thrust of the same. The disk is attached to and supported by a seat held in the oil-box by a bolt passing through the walls of the oil-box and through the seat, thereby allowing the disk and seat to move on its axis formed by the pivotal retaining-bolt.

In the drawings the disk and seat are formed separately. They may be formed together and held by a pivotal retaining-bolt, as before stated.

In the drawings, $b$ represents the disk, riveted or bolted at $b'\,b'$ to the seat $e$, which is held in place in the oil-box by pivotal retaining-bolt $c^2$, which passes through the walls of the oil-box and aperture $c'$ in the seat, thus allowing the disk and seat to adjust itself on its axis formed by the pivotal retaining-bolt to the end of the axle for receiving the end-thrust thereof.

Although a collar is shown in the accompanying drawings, my invention can be used on axles with or without collars.

A concurrent application is herewith made by me for a patent for an improvement in an axle end-bearing for car and locomotive trucks, for one or more disks adapted to take the end-thrust, and to rotate when in contact with the end of the axle.

I do not claim in this application a rotating disk.

What I claim as new, and desire to secure by Letters Patent, is—

The herein-described axle end-bearing for car and locomotive trucks, having a disk held to a seat supported in the oil-box in proximity to and opposite the end of the axle by a pivotal retaining-bolt passing through the walls of the oil-box and seat, for adjusting the disk and receiving the end-thrust of the axle, combined and arranged as described, for the purposes stated.

Signed at Utica, New York, this 14th day of July, 1884.

THOMAS THATCHER.

Witnesses:
CHARLES L. BULLARD,
HUGO WALDMANN.